(12) United States Patent
Nakada (10) Patent No.: US 12,412,404 B2
(45) Date of Patent: Sep. 9, 2025

(54) VEHICLE CABIN STATE RECOGNIZING DEVICE

(71) Applicant: TOYOTA JIDOSHA KABUSHIKI KAISHA, Toyota (JP)

(72) Inventor: Hiroshi Nakada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 18/359,936

(22) Filed: Jul. 27, 2023

(65) Prior Publication Data

US 2024/0135730 A1 Apr. 25, 2024
US 2024/0233406 A9 Jul. 11, 2024

(30) Foreign Application Priority Data

Oct. 19, 2022 (JP) .................................. 2022-167659

(51) Int. Cl.
*G06V 20/59* (2022.01)
*B62D 1/04* (2006.01)
*H04N 23/90* (2023.01)

(52) U.S. Cl.
CPC ............. *G06V 20/597* (2022.01); *B62D 1/04* (2013.01); *H04N 23/90* (2023.01)

(58) Field of Classification Search
CPC ...... G06V 20/597; G06V 10/12; G06V 10/82; G06V 10/96; G06V 20/59; G06V 40/16;
(Continued)

(56) References Cited

U.S. PATENT DOCUMENTS 10,427,689 B2 10/2019 Tokimasa et al.
10,486,698 B2 11/2019 Masui et al.
(Continued)

FOREIGN PATENT DOCUMENTS

JP 2010-013090 A 1/2010
JP 2016-082327 A 5/2016
(Continued)

OTHER PUBLICATIONS

Hirata et al., "Evaluation algorism of camera placement on steering wheel for full-time driver monitoring", IPSJ SIG Technical Report, vol. 2010, Iss. 4, pp. 1-8, (Dec. 15, 2010).

*Primary Examiner* — Nasim N Nirjhar
(74) *Attorney, Agent, or Firm* — SoraIP, Inc.

(57) ABSTRACT

The vehicle cabin state recognizing device of the present disclosure includes a plurality of cameras capable of capturing an image of a vehicle cabin provided on a steering wheel, and an image processing device connected to the plurality of cameras. The image processing device first acquires a captured image from each of the plurality of cameras. The image processing device then determines a shielding state of each of the plurality of cameras from a state of a captured image of each of the plurality of cameras. The image processing device further selects a captured image of the minimum shielding camera having the smallest shielding degree among the plurality of cameras. Then, the image processing device executes recognition processing for recognizing the state of the vehicle cabin with respect to the captured image of the minimum shielding camera.

6 Claims, 6 Drawing Sheets

(58) Field of Classification Search
CPC .......... B62D 1/04; B62D 1/046; H04N 23/90; H04N 23/611; G06T 7/0002; G06T 2207/30168; G06T 2207/30268; B60W 40/08; B60W 2040/0818; B60W 2540/225; B60W 2540/229

See application file for complete search history.

(56) References Cited

U.S. PATENT DOCUMENTS

| | | |
|---|---|---|
| 10,731,996 B2 | 8/2020 | Naito |
| 10,922,561 B2 | 2/2021 | Ozawa et al. |
| 11,017,247 B2 | 5/2021 | Hayashi et al. |
| 11,072,328 B2 | 7/2021 | Masui et al. |
| 11,235,766 B2 | 2/2022 | Masui et al. |
| 11,247,671 B2 | 2/2022 | Komori |
| 2010/0002075 A1 | 1/2010 | Jung et al. |
| 2017/0308771 A1 | 10/2017 | Shimauchi et al. |
| 2020/0326191 A1 | 10/2020 | Naito |
| 2020/0334822 A1* | 10/2020 | Sakai ................ G06T 7/174 |
| 2021/0042915 A1* | 2/2021 | Bernat ............ G06F 18/2413 |
| 2021/0364631 A1 | 11/2021 | Hasegawa et al. |
| 2022/0189210 A1* | 6/2022 | El Youssoufi ......... G06V 40/10 |

FOREIGN PATENT DOCUMENTS

| | | |
|---|---|---|
| JP | 2018-061135 A | 4/2018 |
| JP | 2019-121019 A | 7/2019 |
| JP | 2022-069033 A | 5/2022 |

\* cited by examiner

VEHICLE CABIN STATE RECOGNIZING DEVICE

CROSS-REFERENCE TO RELATED APPLICATION

This application claims priority to Japanese Patent Application No. 2022-167659 filed on Oct. 19, 2022, incorporated herein by reference in its entirety.

BACKGROUND

1. Technical Field

The present disclosure relates to a device for recognizing a state of a vehicle cabin using a camera provided on a steering wheel.

2. Description of Related Art

Japanese Unexamined Patent Application Publication No. 2010-013090 (JP 2010-013090 A) discloses a driving state monitoring system that captures an image of a driver's face using a camera provided on a steering wheel. The driving state monitoring system is configured to rotate the captured image by an angle of the steering wheel to correct the inclination. Further, the driving state monitoring system is configured to extract a feature portion of the driver's face from the corrected image to determine a state of the driver.

SUMMARY

A system disclosed in JP 2010-013090 A includes only one camera near the center of the steering wheel. When the only camera is shielded, the system cannot acquire an image of the driver's face. When a camera is mounted on the steering wheel, the camera is often shielded by the hand or the arm of a person. Therefore, in the system disclosed in JP 2010-013090 A, it is expected that there are many scenes in which a state of a driver cannot be determined.

The present disclosure has been made in view of the above issues. One object of the present disclosure is to make it possible to continuously recognize a state of a vehicle cabin including the state of the driver by using the camera provided on the steering wheel.

The present disclosure provides a vehicle cabin state recognizing device for achieving the above object.

The vehicle cabin state recognizing device according to the present disclosure includes:
  a plurality of cameras that is provided on a steering wheel and that is able to capture an image of a vehicle cabin; and
  an image processing device connected to the cameras.

The image processing device is configured to execute following processes.

A first process is to acquire a captured image from each of the cameras.

A second process is to determine a shielding state of each of the cameras from a state of the captured image of each of the cameras.

A third process is to select a captured image of a minimally shielded camera in which a degree of shielding is the smallest among the cameras.

A fourth process is to perform a recognition process for recognizing a state of the vehicle cabin on the captured image of the minimally shielded camera.

The vehicle cabin state recognizing device according to the present disclosure includes, instead of one camera, a plurality of cameras capable of capturing the image of the vehicle cabin on the steering wheel. Even when some cameras are shielded by the hand or the arm of the person, the image of the vehicle cabin can be captured by other cameras. The vehicle cabin state recognizing device according to the present disclosure performs, with the image processing device, the recognition process for recognizing the state of the vehicle cabin on the captured image of the minimally shielded camera in which the degree of shielding is the smallest among the cameras. As a result, it is possible to continuously recognize the state of the vehicle cabin including the state of the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Outline

Hereinafter, an embodiment of a vehicle cabin state recognizing device of the present disclosure will be described with reference to the drawings. Hereinafter, the term "vehicle cabin state recognizing device" shall mean the vehicle cabin state recognizing device according to the present embodiment.

The vehicle cabin state recognizing device is a device that captures an image of a vehicle cabin by a plurality of cameras and recognizes a state in the vehicle cabin from the captured image. That is, the vehicle cabin state recognizing device is a kind of monitoring system using a camera. However, the vehicle cabin state recognizing device is not a system that monitors the vehicle cabin from multiple directions by a plurality of cameras. The monitoring performed by the vehicle cabin state recognizing device is fixed point monitoring from one fixed point. A fixed point for monitoring in the vehicle cabin state recognizing device is a steering wheel. A plurality of cameras is provided on the steering wheel. The vehicle cabin state recognizing device appropriately selects a camera as a fixed point for monitoring from among a plurality of cameras provided on the steering wheel. The selected camera is a camera that captures the object to be recognized most clearly, specifically, a camera that is not shielded from the field of view or a camera that has the smallest degree of shielding.

The location of the camera on the steering wheel may be on the rim, on the central hub, or on a spoke connecting the rim and the hub. However, it is preferable that the at least one camera is provided at a position located to the left with respect to the center of the steering wheel when the steering wheel is in the neutral position. Preferably, the at least one camera is provided at a position located to the right with respect to the center of the steering wheel when the steering wheel is in the neutral position. It is unlikely that the cameras provided on the left and the right with respect to the center of the steering wheel are simultaneously shielded. Therefore, there is a high possibility that the vehicle cabin can be recognized by at least one of the cameras.

Further, if the number of installed cameras is three or more, it is preferable that the at least one camera is provided at a position located near the center line in the longitudinal direction of the steering wheel when the steering wheel is in the neutral position. More specifically, it is preferable that the camera is installed at a position located below or above the center of the steering wheel when the steering wheel is in the neutral position. By dispersedly providing the cameras in this manner, the possibility that all the cameras are shielded at the same time is reduced. Accordingly, it is possible to increase the possibility that the vehicle cabin can be continuously recognized by any one of the cameras.

The vehicle to which the vehicle cabin state recognizing device is applied includes a manual driving vehicle driven by a driver on the vehicle, an automated driving vehicle driven by an automated driving system, and a remote driving vehicle remotely driven by a remote operator. The state of the vehicle cabin, which is an object of recognition by the vehicle cabin state recognizing device, includes the state of the driver seated in the driver's seat. Examples of the driver's state to be recognized are the orientation of the driver's face, the line of sight angle, the movement of the line of sight, the opening of the eyelid, and the movement of the eyelid. In addition, a state of an occupant other than the driver and an in-vehicle environment are also examples of a state in the vehicle cabin that is an object of recognition by the vehicle cabin state recognizing device. In particular, in the case of an autonomous vehicle or a remote driving vehicle, the driver is not necessarily seated in the driver's seat. Therefore, it is possible to recognize the vehicle cabin environment behind the driver's seat by the camera provided on the steering wheel.

2. Configuration of Vehicle Cabin State Recognizing Device

Figure 1:
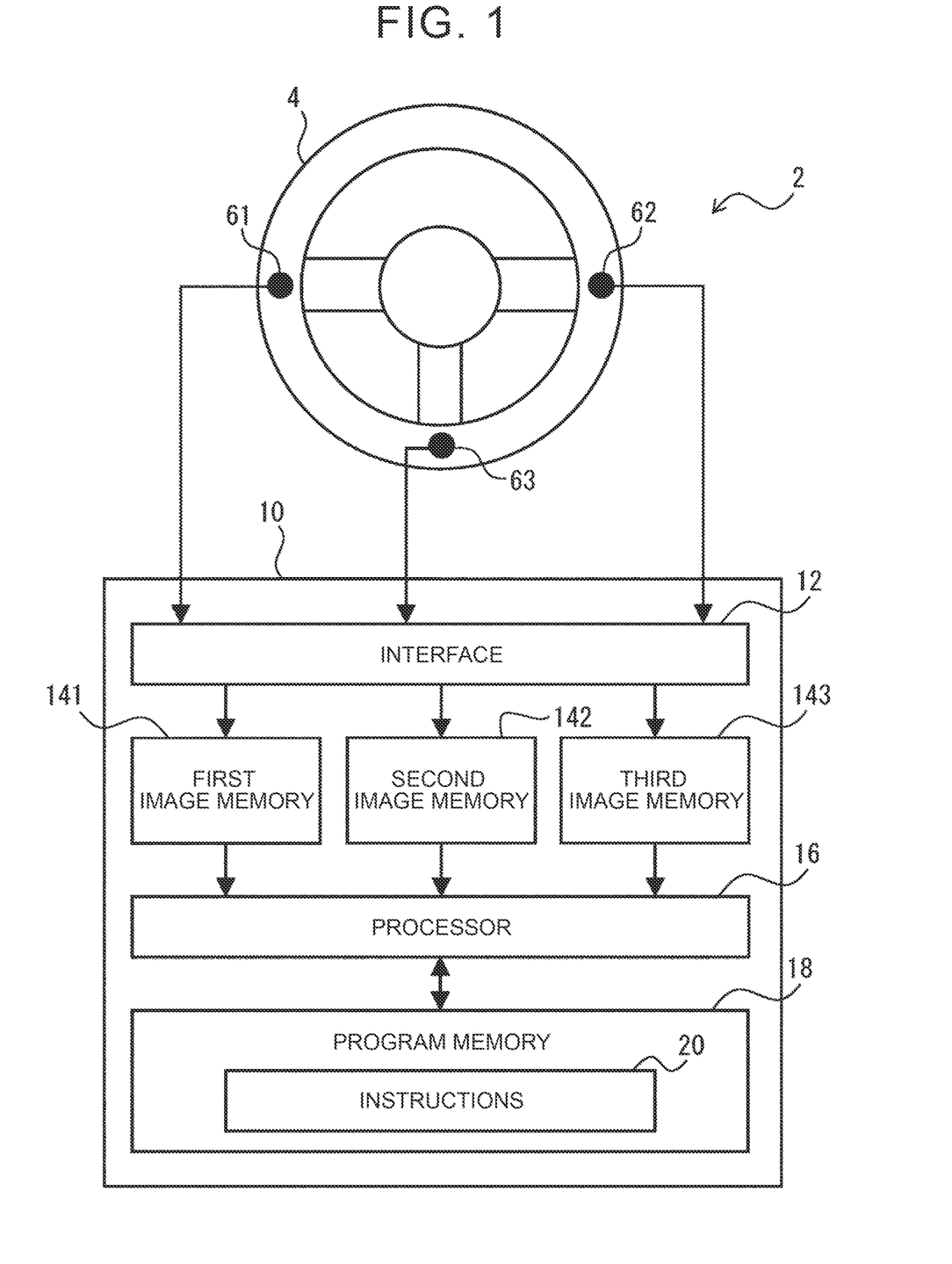
FIG. 1 is a diagram illustrating a configuration of a vehicle cabin state recognizing device according to an embodiment of the present disclosure.

FIG. 1 is a diagram illustrating a configuration of a vehicle cabin state recognizing device 2 according to an embodiment of the present disclosure. The vehicle cabin state recognizing device 2 includes a plurality of cameras 61, 62, and 63 provided on the steering wheel 4. In the example shown in FIG. 1, three cameras 61, 62, 63 are provided on the rim of the steering wheel 4. Specifically, the first camera 61 is provided at a position located to the left with respect to the center of the steering wheel 4 when the steering wheel 4 is in the neutral position. The second camera 62 is provided at a position located to the right with respect to the center of the steering wheel 4 when the steering wheel 4 is in the neutral position. The third camera 63 is provided at a position located directly below the center of the steering wheel 4 when the steering wheel 4 is in the neutral position.

The three cameras 61, 62, and 63 have the same viewing direction. The three cameras 61, 62, and 63 are mounted in a direction in which the vehicle cabin can be photographed. More specifically, the viewing direction of the cameras 61, 62, and 63 is set in a direction in which the driver's face can be photographed when the driver is seated in the driver's seat, and the in-vehicle environment behind the driver's seat can be photographed when the driver is not seated in the driver's seat. The specifications of the cameras 61, 62, and 63 are all the same, including the resolution and the frame rate.

The vehicle cabin state recognizing device 2 includes an image processing device 10. The image processing device 10 is connected to the cameras 61, 62, and 63 by an in-vehicle network such as LVDS. The images captured by the cameras 61, 62, and 63 are captured by the image processing device 10.

The image processing device 10 includes an interface 12, image memories 141, 142, and 143, a processor 16, and a program memory 18. The interface 12 receives images transmitted from the cameras 61, 62, and 63 via the in-vehicle network. The image received by the interface 12 is temporarily stored in the image memories 141, 142, and 143.

The image memories 141, 142, and 143 are frame memories that store image data. The image memories 141, 142, and 143 are provided for respective cameras. That is, the first image memory 141 is provided for the first camera 61. A second image memory 142 is provided for the second camera 62. A third image memory 143 is provided for the third camera 63. However, each of the image memories 141, 142, and 143 may be independent hardware (memory device) or different memory areas of the same memory device. The images temporarily stored in the image memories 141, 142, and 143 are read into the processor 16.

The processor 16 may be, for example, a CPU, GPU, FPGA, or an ASIC. Alternatively, the processor 16 may be a CPU, GPU, FPGA, or a combination of two or more ASIC. The program memory 18 stores a plurality of instructions 20 executable by the processor 16. The processor 16 reads and executes the instructions 20 from the program memory 18. When the instruction 20 stored in the program memory 18 is executed by the processor 16, the processor 16 executes processing for recognizing the vehicle cabin state on the images read from the image memories 141, 142, and 143.

Note that the image processing device 10 may be configured to be connected to a communication network using a communication device (not shown) and to communicate with an external monitoring center. When the recognition result of the vehicle cabin state is transmitted from the image processing device 10 to the monitoring center, the vehicle cabin state can be remotely monitored at the monitoring center.

3. Operation of Vehicle Cabin State Recognizing Device

Next, an operation of the vehicle cabin state recognizing device 2 configured as described above will be described. The image processing device 10 selects the minimum shielding camera having the smallest shielding degree among the three cameras 61, 62, and 63. The image processing device 10 performs recognition processing on an image captured by the minimum shielding camera. Examples of the occlusion conditions of the cameras 61, 62, 63 are shown in FIGS. 2A, 2B, 3A, and 3B.

Figure 2A:
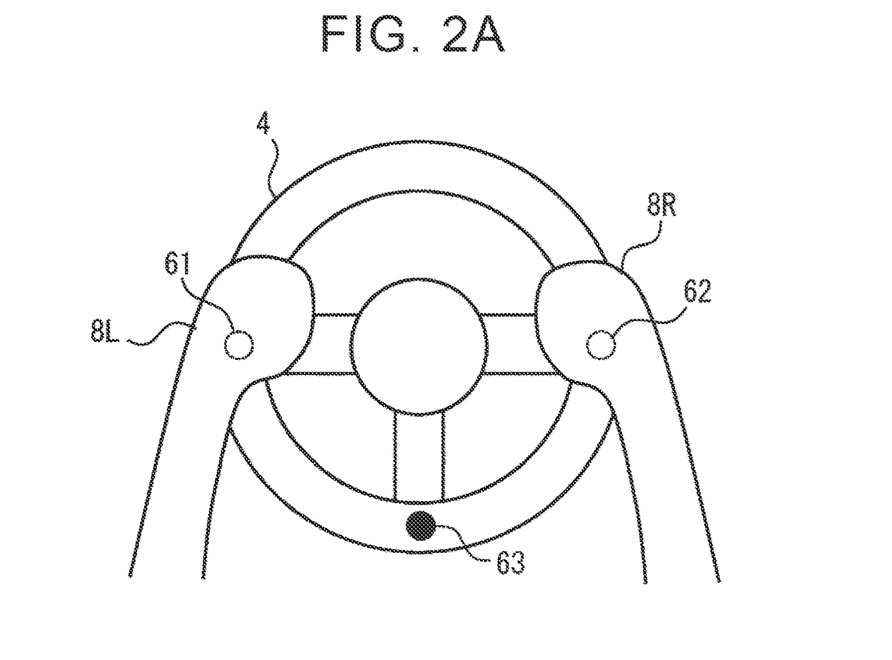
FIG. 2A is a diagram illustrating the selection of cameras for use in recognizing vehicle cabin conditions.

In FIG. 2A, the first camera 61 is shielded by the left-hand 8L, and the second camera 62 is shielded by the right-hand 8R. However, the third camera 63 is not shielded. In the condition shown in FIG. 2A, the third camera 63 is a minimally shielded camera.

Figure 2B:
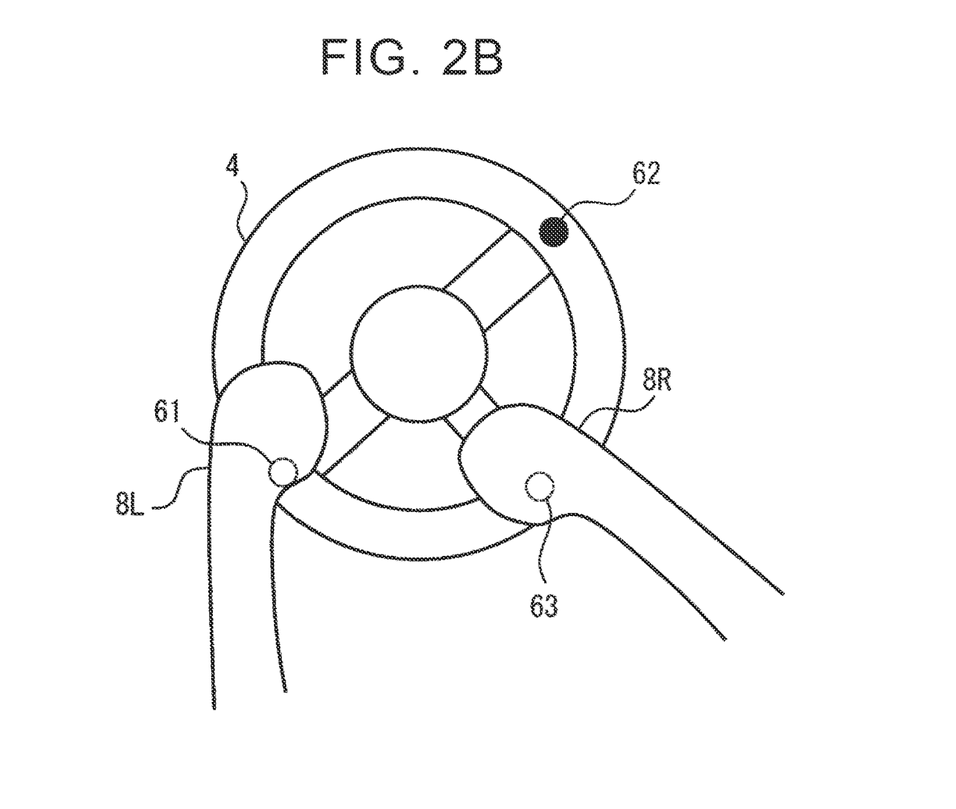
FIG. 2B is a diagram illustrating the selection of cameras for use in recognizing vehicle cabin conditions.

It is assumed that the steering wheel 4 is turned from the state shown in the drawing 2A to the state shown in FIG. 2B. In FIG. 2B, the first camera 61 is shielded by the left-hand 8L, and the third camera 63 is shielded by the right-hand 8R.

However, the second camera 62 is not shielded. In the condition shown in FIG. 2B, the second camera 62 is a minimally shielded camera.

When moving from the state shown in FIG. 2A to the state shown in FIG. 2B, the smallest shielding camera is switched from the third camera 63 to the second camera 62. When the camera is switched, the image processing device 10 performs correction processing for suppressing discontinuities in recognition results. The details of the correction processing will be described later.

Figure 3A:
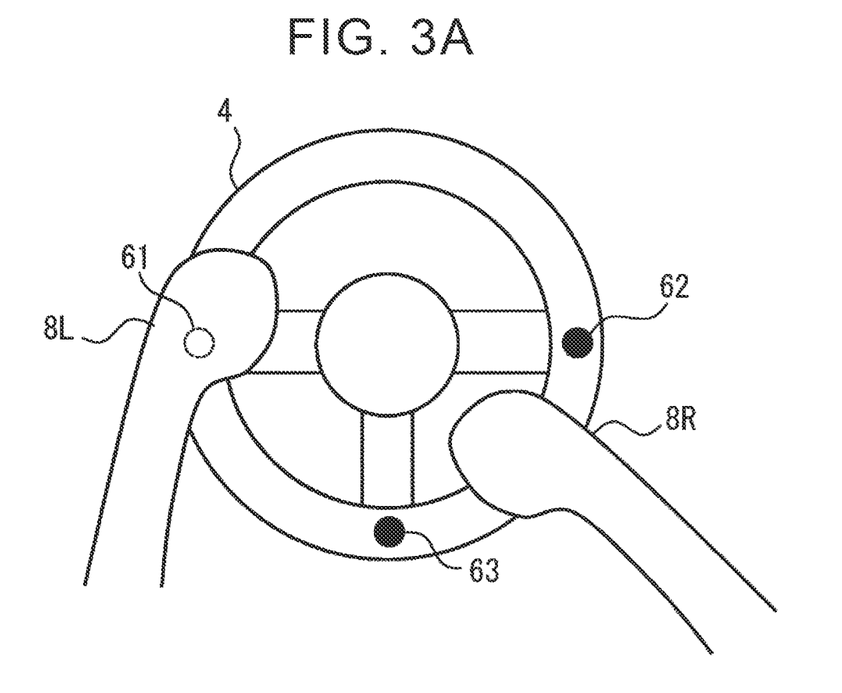
FIG. 3A is a diagram illustrating the selection of cameras for use in recognizing vehicle cabin conditions.

In FIG. 3A, the first cameras 61 are shielded by the left-hand 8L. However, the second camera 62 and the third camera 63 are not shielded. In the situation shown in FIG. 3A, the second camera 62 and the third camera 63 are both minimally shielded cameras. The image captured by the second camera 62, which is the minimum shielding camera, and the image captured by the third camera 63, which is also the minimum shielding camera, are candidate images that can be used for recognition of the vehicle cabin state. The image processing device 10 selects one image from among the candidate images by the method described later.

Figure 3B:
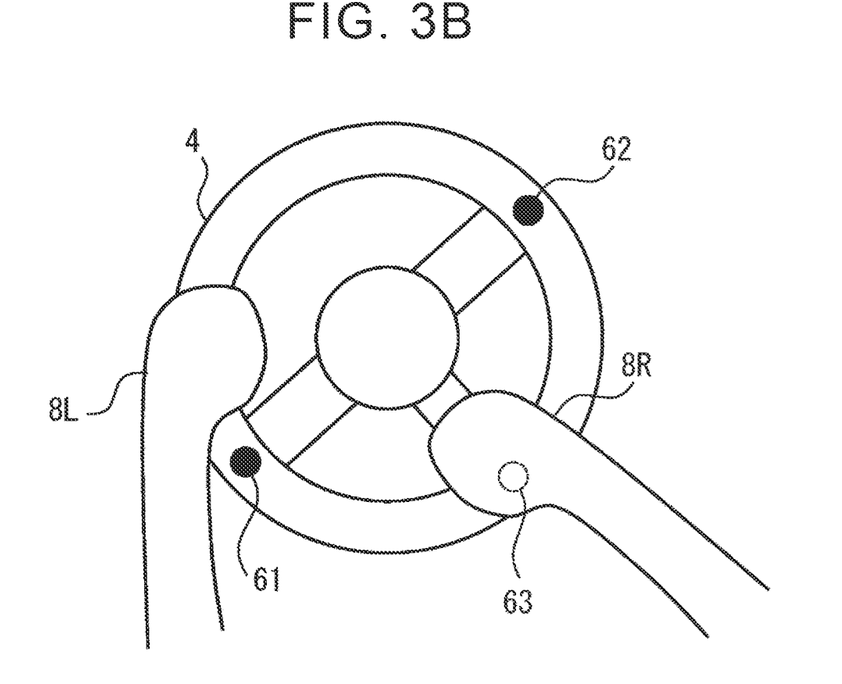
FIG. 3B is a diagram illustrating the selection of cameras for use in recognizing vehicle cabin conditions.

It is assumed that the steering wheel 4 is turned from the state shown in FIG. 3A to the state shown in FIG. 3B. In FIG. 3B, the third camera 63 is shielded by the right-hand 8R. However, the first camera 61 and the second camera 62 are not shielded. In the situation shown in FIG. 3B, the first camera 61 and the second camera 62 are both minimally shielded cameras. Both the image captured by the first camera 61, which is the minimum shielding camera, and the image captured by the second camera 62, which is also the minimum shielding camera, are candidate images that can be used for recognition of the vehicle cabin state. The image processing device 10 selects one image from among the candidate images.

In FIG. 3A, when the camera used for recognition is the second camera 62 and the camera used for recognition in FIG. 3B is the second camera 62, the switching of the minimally shielded camera is not performed when the state is shifted from the state illustrated in FIG. 3A to the state illustrated in FIG. 3B. However, for example, when the camera used for recognition in FIG. 3A is the third camera 63 and the camera used for recognition in FIG. 3B is the first camera 61, switching to the minimally shielded camera occurs when the state is shifted from the state shown in FIG. 3A to the state shown in FIG. 3B. In this case, the image processing device 10 performs correction processing for suppressing discontinuity in the recognition result on the image captured by the third camera 63.

Figure 4:
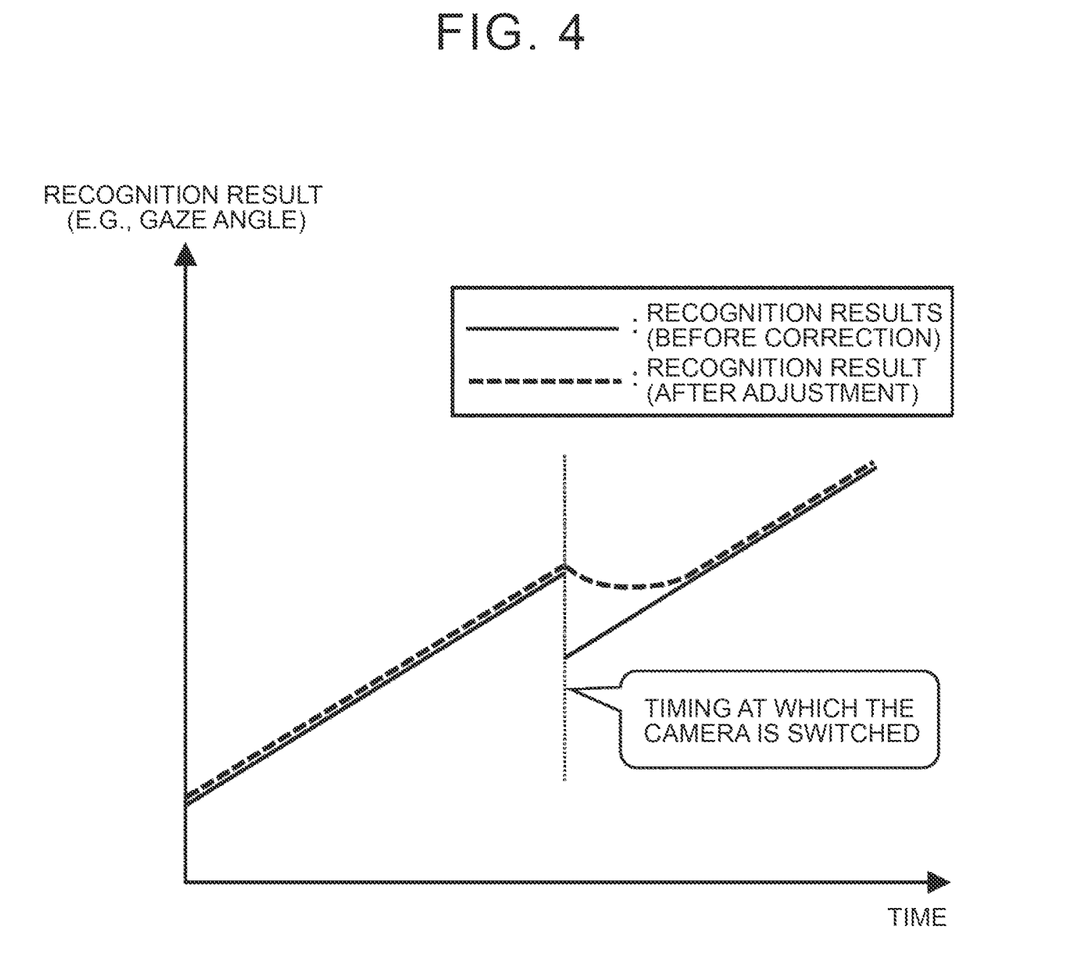
FIG. 4 is a diagram for explaining correction processing at the time of switching a camera used for recognition of a vehicle cabin state.

FIG. 4 is a diagram for explaining correction processing at the time of switching a camera used for recognition of a vehicle cabin state. FIG. 4 shows an example of a temporal change in the recognition result of the vehicle cabin state. As an example of the recognition result of the vehicle cabin state, the line-of-sight angle of the driver is illustrated in FIG. 4. The recognition result indicated by a solid line in FIG. 4 indicates the recognition result of the line-of-sight angle before correction. The recognition result indicated by the dotted line in FIG. 4 indicates the recognition result of the corrected line-of-sight angle.

The cameras 61, 62, 63 are mounted in the same direction. Further, the image processing device 10 corrects the inclination by rotating the images captured by the cameras 61, 62, and 63 by the rotation angle of the steering wheel 4. However, as indicated by a solid line in FIG. 4, a discontinuity may occur between the recognition result of the line-of-sight angle before the switching of the camera and the recognition result of the line-of-sight angle after the switching of the camera. The image processing device 10 performs correction processing on the recognition result of the line-of-sight angle after the switching in order to eliminate the discontinuity of the recognition result of the line-of-sight angle before and after the switching. An example of the correction process may be a Kalman filter.

Figure 5:
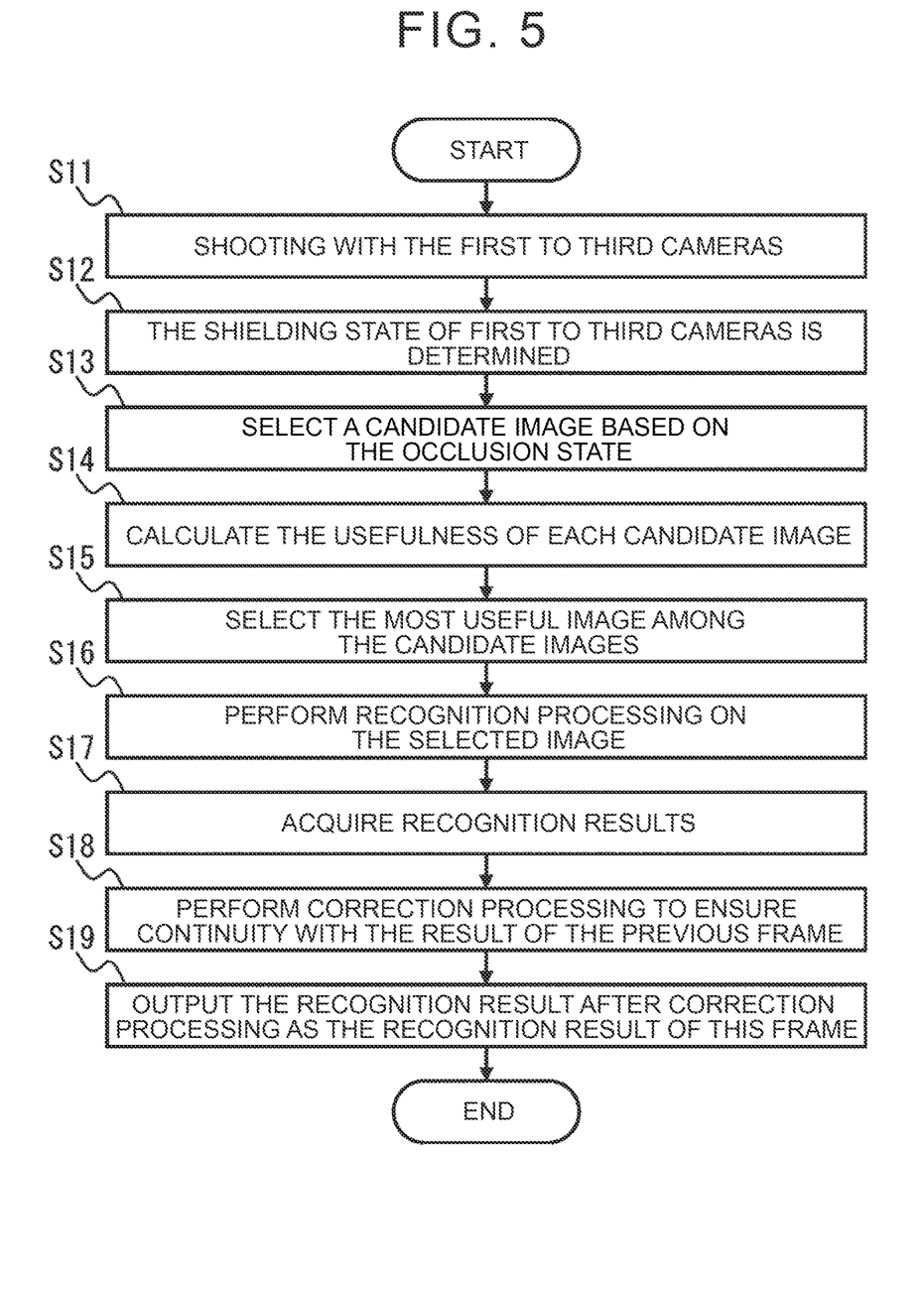
FIG. 5 is a flow chart illustrating a first exemplary operation of the vehicle cabin state recognizing device.
Figure 6:
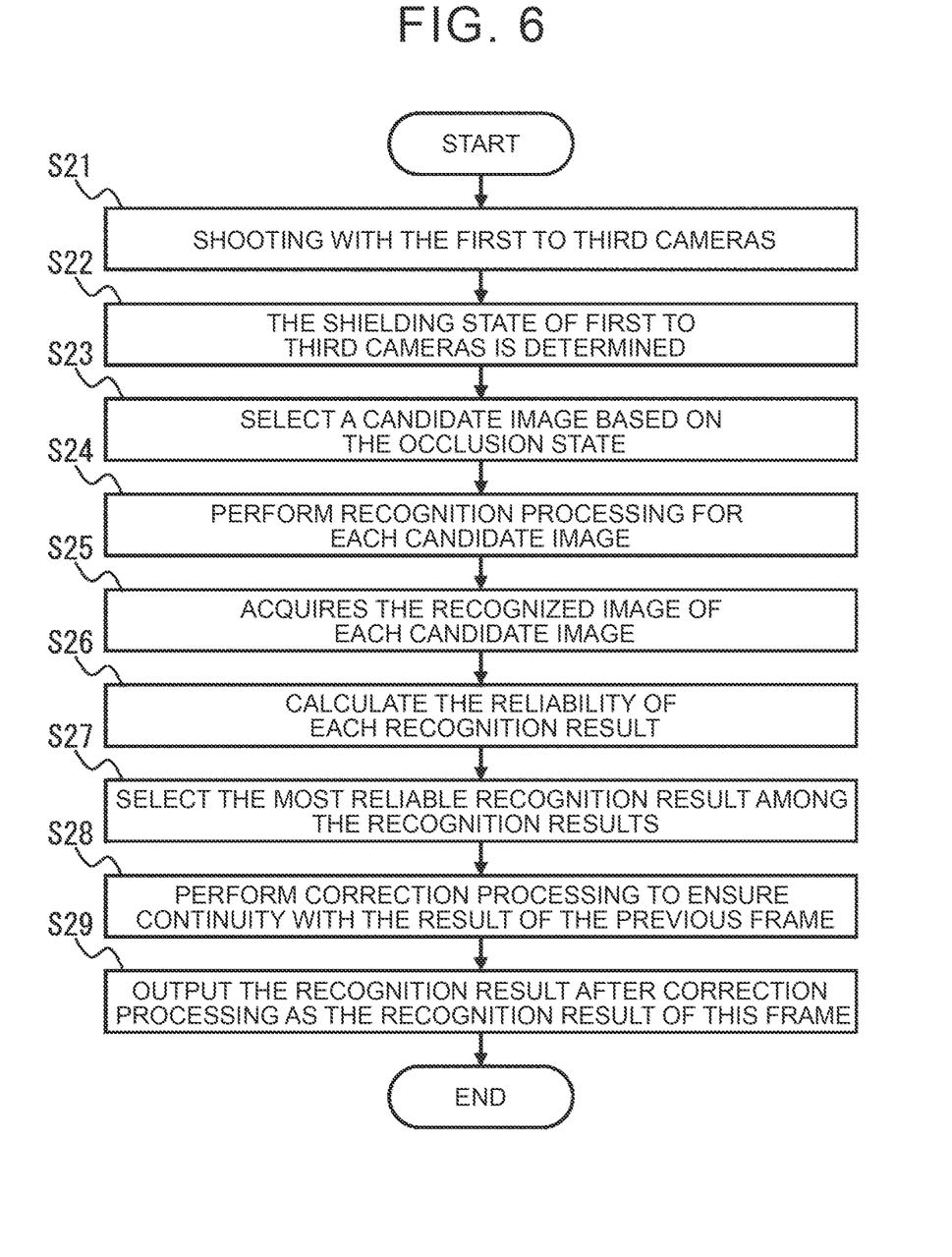
FIG. 6 is a flowchart illustrating a second example of the operation of the vehicle cabin state recognizing device.

The operation of the vehicle cabin state recognizing device 2 is represented by a flowchart. FIG. 5 is a flowchart illustrating a first example of the operation of the vehicle cabin state recognizing device. FIG. 6 is a flowchart illustrating a second example of the operation of the vehicle cabin state recognizing device. Whether the vehicle cabin state recognizing device 2 operates in the first example or the second example depends on the processing performed by the image processing device 10, and more specifically, the content of the instruction 20 executed by the processor 16.

First, a first example of the operation of the vehicle cabin state recognizing device 2 will be described with reference to FIG. 5. In the first example, the vehicle cabin state recognizing device 2 executes a series of processes illustrated in a flowchart in FIG. 5 for each frame of the cameras 61, 62, and 63.

In S11, the cameras 61, 62, and 63 photograph the vehicle cabin. The images captured by the cameras 61, 62, and 63 are captured by the image processing device 10. The image processing device 10 stores the captured images of the respective cameras 61, 62, and 63 in the corresponding image memories 141, 142, and 143.

In S12, the image processing device 10 determines the shielding state of each of the cameras 61, 62, and 63 from the state of the captured image of each of the cameras 61, 62, and 63. For example, an image in which the entire image is too dark or an image in which a portion having a uniform brightness occupies a predetermined proportion or more of the entire image may be determined to be an image captured by a shielded camera. Note that the concept of the shielding state includes not only whether or not the image is shielded, but also a shielding degree calculated from a ratio of a portion where the darkness and the brightness of the image are uniform.

In S13, the image processing device 10 selects a candidate image that can be a target of the recognition processing from the captured images of the cameras 61, 62, and 63 based on the shielding conditions of the cameras 61, 62, and 63. The candidate image is a captured image of the minimum shielding camera having the smallest shielding degree. In the embodiment shown in FIG. 2A, the candidate image is a captured image of the third camera 63. In the embodiment shown in FIG. 2B, the candidate image is a captured image of the second camera 62. In the embodiment shown in FIG. 3A, the candidate images are captured images of the second camera 62 and captured images of the third camera 63. In the embodiment shown in FIG. 3B, the candidate images are captured images of the first camera 61 and captured images of the second camera 62.

In S14, the image processing device 10 calculates the usefulness of the respective candidate images. Usefulness means usefulness in recognition processing. An advantageous image for recognizing the state in the vehicle cabin is an image with high usefulness. As the usefulness, for example, the sharpness of the image, the proximity of the distance from the camera to the subject, and the number of feature points of the subject included in the image can be used.

In S15, the image processing device 10 selects the image having the highest usefulness among the candidate images. In the embodiment shown in FIG. 3A, an image having a higher usefulness is selected from the captured image of the second camera 62 and the captured image of the third camera 63. In the embodiment shown in FIG. 2A, since the candidate image is only the captured image of the third camera 63, the captured image of the third camera 63 is selected. However, S14 and S15 processes may be omitted if there is only one candidate-image as in this embodiment.

In S16, the image processing device 10 executes a recognition process for recognizing the vehicle cabin condition on the image selected in step 16. For the recognition process, for example, machine learning including deep learning is used.

In S17, the image processing device 10 acquires the recognition result of the vehicle cabin state by the recognition processing executed in step 16.

In S18, the image processing device 10 executes a correcting process for ensuring continuity with the recognition result of the previous frame with respect to the recognition result acquired by S17. An example of the contents of the correction process is as described with reference to FIG. 4.

Then, in S19, the image processing device 10 outputs the recognition result corrected by S18 as the recognition result of the present frame. The recognition result output from the image processing device 10 is used in, for example, a driving assistance system. In a case where it can be determined from the recognition result that the driver's arousal level is reduced, or in a case where it can be determined that the driver's attention is reduced, the driving support system executes control for ensuring safety. The control for ensuring safety includes, for example, reminding the driver of attention, stopping the vehicle at a safe place, and switching from manual driving to automatic driving.

Next, a second example of the operation of the vehicle cabin state recognizing device 2 will be described with reference to FIG. 6. In the second example, the vehicle cabin state recognizing device 2 executes a series of processes illustrated in a flowchart in FIG. 6 for each frame of the cameras 61, 62, and 63.

In S21, the image processing device 10 performs the same processing as S11 in the first embodiment. In S22, the image processing device 10 performs the same processing as S12 in the first embodiment. Then, in S23, the image processing device 10 performs the same processing as S13 in the first embodiment.

In S24, the image processing device 10 executes a recognition process for recognizing the vehicle cabin condition with respect to the respective candidate images selected by S23.

In S25, the image processing device 10 acquires, for each candidate image, the recognition result of the vehicle cabin state by the recognition processing executed in step 24.

In S26, the image processing device 10 calculates the reliability of the recognition-result for each of the candidate images acquired in step 25. The method of calculating the reliability of the recognition result differs depending on the recognition target. For example, when the recognition target is a driver, the line-of-sight angle is determined from the position of the pupil. From this, it is determined that the higher the size of the recognized driver's eye, the higher the reliability. When the recognition target is an occupant in the vehicle cabin, the higher the estimation accuracy of the skeleton, the higher the reliability is determined.

In S27, the image processing device 10 selects the most reliable recognition result among the recognition results. In the embodiment shown in FIG. 3A, a more reliable recognition result is selected from the recognition result obtained from the captured image of the second camera 62 and the recognition result obtained from the captured image of the third camera 63. In the embodiment shown in FIG. 2A, the recognition result is only the recognition result obtained from the captured images of the third cameras 63. Therefore, the recognition result obtained from the captured image of the third camera 63 is selected. However, S26 and S27 processes may be omitted if there is only one recognition result as in this example.

In S28, the image processing device 10 executes a correcting process for ensuring continuity with the recognition result of the previous frame with respect to the recognition result acquired by S27.

Then, in S29, the image processing device 10 outputs the recognition result corrected by S28 as the recognition result of the present frame. According to the second example, as in the first example, the state in the vehicle cabin can be continuously recognized. Furthermore, the condition in the vehicle cabin can be recognized with substantially the same quality as in the first example.

What is claimed is:

1. A vehicle cabin state recognizing device comprising:
   a plurality of cameras that is provided on a steering wheel of a vehicle and that is configured to capture an image of a vehicle cabin of the vehicle; and
   an image processing device connected to each of the plurality of cameras, wherein the image processing device includes a processor, wherein the processor is configured to:
   acquire the image captured by each of the plurality of cameras from each of the plurality of cameras;
   calculate a brightness value of the image captured by each of the plurality of cameras;
   select a camera from the plurality of cameras based on the brightness value, wherein the brightness value of the image captured by the selected camera is equal to or greater than a first predetermined value, wherein the selected camera is determined to be unshielded or partially shielded by a driver in the vehicle;
   perform a recognition process recognizing a state of the vehicle cabin on the image captured by the selected camera; and
   output a first recognition result of the recognition process recognizing the state of the vehicle cabin to a driving support system included in the vehicle.

2. The vehicle cabin state recognizing device according to claim 1, wherein:
   at least one of the plurality of cameras is provided at a left position relative to a center of the steering wheel when the steering wheel is in a neutral position; and
   at least one of the plurality of cameras is provided at a right position relative to the center of the steering wheel when the steering wheel is in the neutral position.

3. The vehicle cabin state recognizing device according to claim 1, wherein:
   the plurality of cameras include at least three cameras;
   at least one of the plurality of cameras is provided at a left position relative to a center of the steering wheel when the steering wheel is in a neutral position;
   at least one of the plurality of cameras is provided at a right position relative to the center of the steering wheel when the steering wheel is in the neutral position; and
   at least one of the plurality of cameras is provided at a position close to a center line of the steering wheel when the steering wheel is in the neutral position.

4. The vehicle cabin state recognizing device according to claim 1, wherein the processor is further configured to:
   select a plurality of the selected camera;

calculate a sharpness value of each of images captured by the plurality of selected cameras;

select an image from the images captured by the plurality of selected cameras based on the sharpness value, wherein the sharpness value of the selected image is equal to or greater than a second predetermined value; and perform the recognition process on the selected image.

5. The vehicle cabin state recognizing device according to claim 1, wherein the recognition process further recognizes a state of the driver, and the processor is further configured to:

select a plurality of the selected camera;

perform the recognition process on each of images captured by the plurality of selected cameras and obtain second recognition results;

calculate an eye size value of the driver in each of the second recognition results;

select a second recognition result from the second recognition results, wherein the eye size value in the selected second recognition result is the greatest in the calculated eye size value in the second recognition results; and output the selected second recognition result to the driving support system included in the vehicle.

6. The vehicle cabin state recognizing device according to claim 1, wherein the processor is further configured to recalculate the brightness value of the image captured by each of the plurality of cameras after a predetermined period of time has elapsed, and repeat the selection of the camera from the plurality of cameras based on the recalculated brightness value.

* * * * *